United States Patent
Kim et al.

(10) Patent No.: US 12,024,066 B2
(45) Date of Patent: Jul. 2, 2024

(54) MULTI-POSITION SEAT

(71) Applicants: Hyundai Motor Company, Seoul (KR); Kia Corporation, Seoul (KR); Hyundai Transys Inc., Seosan-si (KR); Daechang Seat Co., LTD-Dongtan, Hwaseong-si (KR)

(72) Inventors: Eun Sue Kim, Hwaseong-si (KR); Seung Sik Han, Hwaseong-si (KR); Hong Heui Lee, Suwon-si (KR); Myung Hoe Kim, Seoul (KR); Jong Tak Lee, Gwangmyeong-si (KR); Hae Dong Kwak, Hwaseong-si (KR); Cheol Hwan Yoon, Hwaseong-si (KR); Jun Sik Hwang, Hwaseong-si (KR); In Sun Baek, Hwaseong-si (KR); Sin Chan Yang, Hwaseong-si (KR); Myung Soo Lee, Osan-si (KR); Chan Ki Cho, Gwangju (KR)

(73) Assignees: Hyundai Motor Company, Seoul (KR); Kia Corporation, Seoul (KR); Hyundai Transys Inc., Seosan-si (KR); Daechang Seat Co. LTD-Dongtan, Hwaseong-si (KR)

( * ) Notice: Subject to any disclaimer, the term of this patent is extended or adjusted under 35 U.S.C. 154(b) by 345 days.

(21) Appl. No.: 17/532,916

(22) Filed: Nov. 22, 2021

(65) Prior Publication Data
US 2022/0379774 A1     Dec. 1, 2022

(30) Foreign Application Priority Data
Jun. 1, 2021     (KR) .......................... 10-2021-0071058

(51) Int. Cl.
*B60N 2/02*     (2006.01)
*B60N 2/12*     (2006.01)
(Continued)

(52) U.S. Cl.
CPC ........... *B60N 2/02246* (2023.08); *B60N 2/12* (2013.01); *B60N 2/1625* (2013.01); *B60N 2/165* (2013.01); *B60N 2/20* (2013.01); *B60N 2/02253* (2023.08)

(58) Field of Classification Search
CPC .... B60N 2/02246; B60N 2/12; B60N 2/1625; B60N 2/06; B60N 2/067; B60N 2/0722;
(Continued)

(56) References Cited

U.S. PATENT DOCUMENTS 5,374,022 A  * 12/1994  Gilmer, Jr. .............. B63B 29/04
                                                    248/656
7,686,397 B2 *  3/2010  Sahi ..................... B60N 2/1615
                                                    297/334
(Continued)

FOREIGN PATENT DOCUMENTS

FR           3074106         11/2017
JP           S56-131432      10/1981
KR           10-2199150 B1   12/2020

*Primary Examiner* — Mark R Wendell
(74) *Attorney, Agent, or Firm* — MORGAN, LEWIS & BOCKIUS LLP

(57) ABSTRACT

A multi-position seat configured to maximize usability thereof through various changes in the positions of a seat back and a seat cushion may include a height assembly configured to move a base frame mounted on a vehicle body, a slide assembly configured to move a seat cushion frame, which is positioned above the base frame and is connected to the base frame via a link mechanism, upwards and downwards by sliding action of the link mechanism in a forward and backward direction, a tilt assembly configured to move a rear end portion of the seat cushion frame upwards and downwards, and a seat back frame hingedly coupled to a rear end portion of the base frame to be reclined.

20 Claims, 13 Drawing Sheets

(51) Int. Cl.
*B60N 2/16* (2006.01)
*B60N 2/20* (2006.01)

(58) Field of Classification Search
CPC ...... B60N 2/165; B60N 2/20; B60N 2/02253; B60N 2/0224; B60N 2/3011; B60N 2/10; B60N 2/1814; B60N 2/22
See application file for complete search history.

(56) References Cited

U.S. PATENT DOCUMENTS

| | | | |
|---|---|---|---|
| 9,290,115 B2* | 3/2016 | Lutzka | B60N 2/3065 |
| 2004/0075322 A1* | 4/2004 | Jaeger | B60N 2/02246 |
| | | | 297/325 |
| 2009/0167046 A1* | 7/2009 | Yamagishi | B60N 2/3013 |
| | | | 297/340 |
| 2020/0047642 A1* | 2/2020 | Han | B60N 2/0252 |

* cited by examiner

MULTI-POSITION SEAT

CROSS-REFERENCE TO RELATED APPLICATION

The present application claims priority to Korean Patent Application No. 10-2021-0071058, filed on Jun. 1, 2021, the entire contents of which is incorporated herein for all purposes by this reference.

BACKGROUND OF THE INVENTION

Field of the Invention

The present invention relates to a multi-position seat configured to maximize the usability thereof through various changes in the positions of a seat back and a seat cushion.

Description of Related Art

In electric vehicles, there is a need to realize a passenger compartment similar to a living space by taking advantage of the flat floor thereof, which is a characteristic thereof.

Furthermore, in autonomous vehicles, purpose built vehicles (PBV), and vehicles in which three rows of seats are mounted, various concepts of a bed seat suitable for resting and sleeping during traveling have been suggested. With the expansion of independent leisure culture, the number of people who enjoy camping or travel while sleeping in vehicles is also increasing day by day.

However, a conventional bed-type seats and seats for camping vehicles, which are available from aftermarket manufactures, camping vehicle makers and the like, have limitations with regard to the safety and convenience of use thereof.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a multi-position seat configured to maximize usability thereof by various changes of positions of a seat back and a seat cushion.

In accordance with various aspects of the present invention, the above and other objects may be accomplished by the provision of a multi-position seat including a height assembly configured to move a base frame mounted on a vehicle body, a slide assembly configured to move a seat cushion frame, which is positioned above the base frame and is connected to the base frame via a link mechanism, upwards and downwards through sliding action of the link mechanism in a forward and backward direction, a tilt assembly configured to move the rear end portion of the seat cushion frame upwards and downwards, and a seat back frame hingedly coupled to the rear end portion of the base frame to be reclined.

The height assembly may include a leg frame provided on the bottom surface of a passenger compartment, a height link, which is disposed between the leg frame and the base frame and is connected thereto via a four-link mechanism, a height drive unit configured to supply driving force, and a gear engagement structure configured to transmit the driving force supplied by the height drive unit to the height link to rotate the height link.

A drive gear may be provided at an output shaft of the height drive unit, and a driven gear may be provided at a predetermined radial distance from a hinge shaft of the height link to be gear-engaged with the drive gear.

The drive gear may be provided at the base frame, and the driven gear may be formed around the hinge shaft of the height link coupled to the base frame.

A stopping hole having a sector shape, a center of which is located at the hinge shaft, may be formed between the hinge shaft of the height link and the driven gear, and a stopper may be disposed in the stopping hole to limit the rotational angle of the height link.

The slide assembly may include a slide drive unit configured to supply driving force, a dive link, first and second end portions of which are respectively connected to the seat cushion frame and to a front end portion of the base frame, and a slide link unit, which is connected at the front end portion thereof to the slide drive unit and is rotatably connected at the rear end portion thereof to the rear end portion of the seat cushion frame to slide together with the seat cushion frame in a forward and backward direction using the driving force of the slide drive unit.

The slide link unit may include a slide link, which is rotatably connected at the rear end portion thereof to the seat cushion frame, a slide bracket, which is rotatably connected at the front end portion thereof to the front end portion of the slide link, and a slide actuation bar, which is connected at the front end portion thereof to the slide drive unit to provide a driving force and is coupled at the rear end portion thereof to the rear end portion of the slide bracket.

The slide drive unit and the slide actuation bar may be connected to each other via a ball screw structure so that rotational driving force of the slide drive unit is converted into linear movement of the slide actuation bar.

The multi-position seat may further include a slide guide, which is coupled to the base frame and has therein a guide hole, which extends in the sliding direction of the slide link unit, and a guide hinge portion, to which a front end portion of the slide link and the front end portion of the slide bracket are connected, may be disposed in the guide hole and move in a forward and backward direction therein.

The tilt assembly may include a tilt drive unit configured to supply driving force, and a tilt actuation bar, which is connected to the rear end portion of the seat cushion frame and to the tilt drive unit and which is linearly moved in a forward and backward direction using the driving force of the tilt drive unit to move the rear end portion of the seat cushion frame upwards or downwards.

The tilt drive unit and the tilt actuation bar may be connected to each other via a ball screw structure such that the rotational driving force supplied from the tilt drive unit is converted into linear movement of the tilt actuation bar.

The rear end portion of the tilt drive unit may be hingedly coupled to the base frame such that the tilt actuation bar is rotated upwards and downwards together with the front end portion of the tilt drive unit about the rear end portion of the tilt drive unit.

The seat cushion frame may be rotated forwards and downwards by actuation of the slide assembly, and the seat back frame may be folded completely forwards by reclining actuation, realizing a dive position in which a rear surface of a seat back is positioned horizontally.

The base frame may be rotated and moved upwards by actuation of the height assembly, the rear end portion of the seat cushion frame may be moved upwards by actuation of the tilting assembly, and the seat back frame may be folded completely backwards by reclining actuation, realizing a flat bed position in which an upper surface of a seat cushion and a front surface of a seat back are flush with each other in a horizontal state.

The rear end portion of the seat cushion frame may be moved downwards by actuation of the tilt assembly, and the seat back frame may be folded backwards within a predetermined angular range by reclining actuation, realizing a relaxation position of the multi-position seat.

The multi-position seat may further include a controller configured to perform control to determine whether or not conversion of the multi-position seat from or into the flat bed position is allowed depending on the current gear shifting state and the posture of the passenger sitting on the multi-position seat.

The controller may perform control to allow a position of the multi-position seat to be converted into the flat bed position when only in a "P" gear shifting stage is active.

The controller may perform control to allow a driver to select a "D" gear shifting stage of a vehicle when a position of the multi-position seat is converted into a normal seating position from the flat bed position.

The multi-position seat may further include a skirt frame, rotatably coupled to the lower end portion of the seat back frame to be rotated about a skirt hinge shaft, a side frame, which is formed on the front surface of the seat back frame and the lower end portion of which extends toward the front surface of the skirt frame to limit rotation of the skirt frame when the seat back frame is folded forwards, and an elastic member, configured to provide an elastic force to rotate an end portion of the skirt frame toward the side frame.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
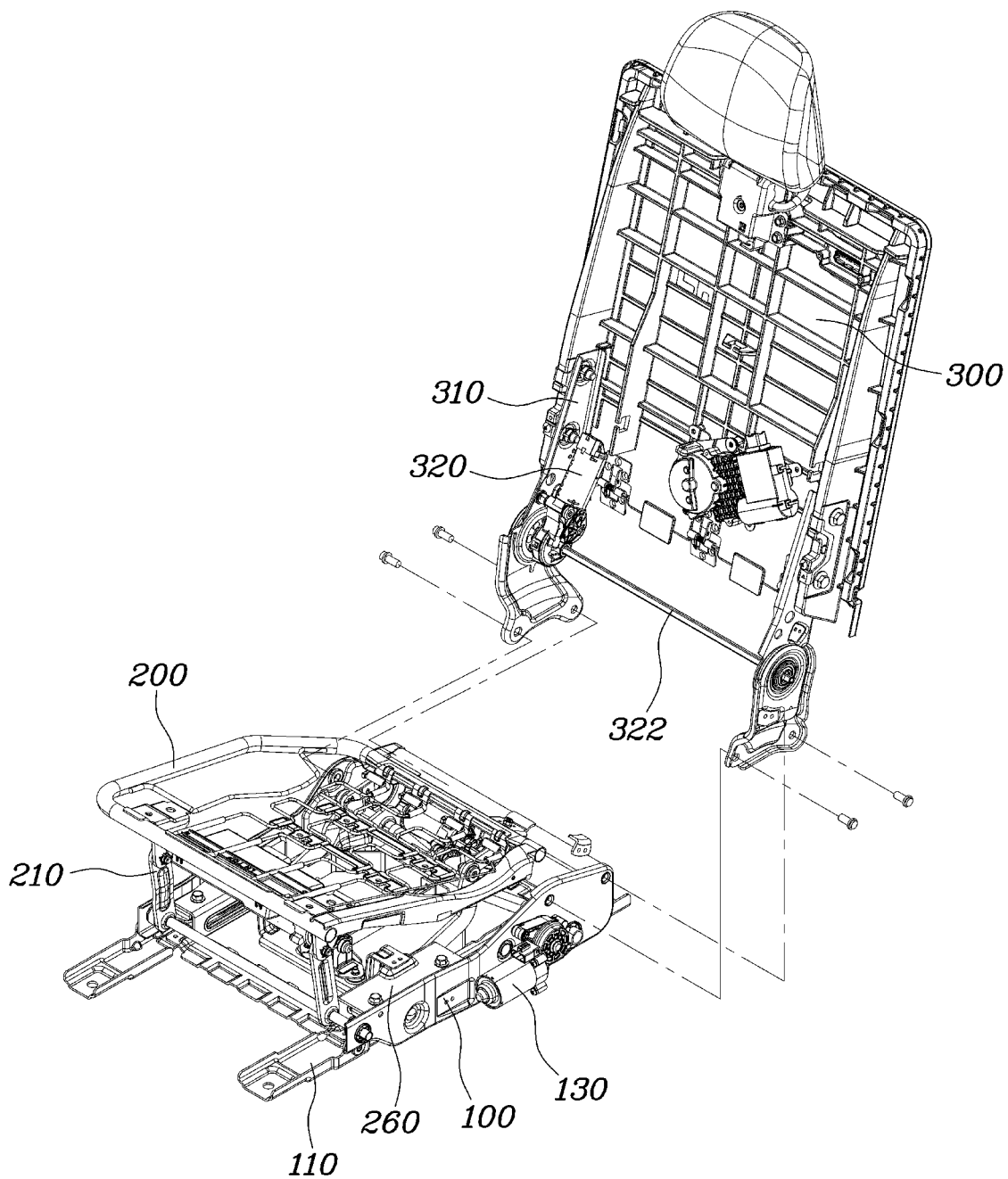
FIG. 1 is a view exemplarily illustrating a multi-position seat according to various exemplary embodiments of the present invention in which a seat cushion and a seat back are separated from each other.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the FIGURES, reference numbers refer to the same or equivalent parts of the present invention throughout the several FIGURES of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like portions.

Exemplary embodiments of the present invention will be described with reference to the accompanying drawings.

Figure 2:
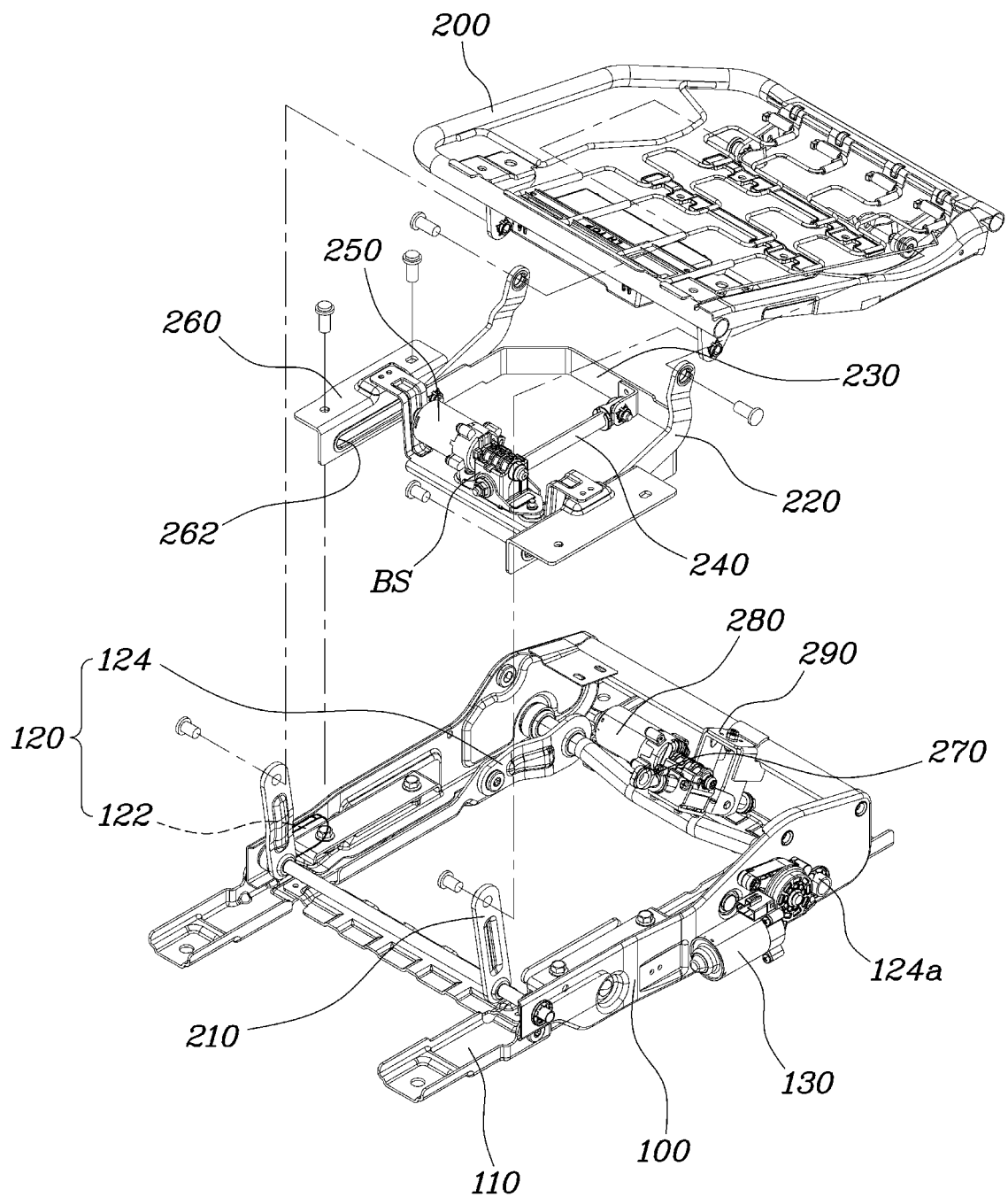
FIG. 2 is a view exemplarily illustrating the multi-position seat shown in FIG. 1 in which the components of the seat cushion are separated from each other.

FIG. 1 is a view exemplarily illustrating a multi-position seat according to various exemplary embodiments of the present invention in which a seat cushion and a seat back are separated from each other. FIG. 2 is a view exemplarily illustrating the multi-position seat shown in FIG. 1 in which the components of the seat cushion are separated from each other.

Referring to the drawings, the multi-position seat according to the exemplary embodiment of the present invention includes a height assembly configured to move a base frame 100 mounted on the vehicle body upwards and downwards, a slide assembly configured to move a seat cushion frame 200, which is disposed above the base frame 100 and is connected to the base frame 100 via a link mechanism, through sliding action of a link in a forward and backward direction, a tilt assembly configured to move the rear end portion of the seat cushion frame 200 upwards or downwards, and a seat back assembly 300 hingedly coupled to the rear end portion of the base frame 100 to be reclined.

For example, side frames 310 are formed at the two lateral sides of the seat back frame 300, and the rear end portion of the side frame 310 is coupled to the rear end portion of the base frame 100 via a reclining hinge shaft, whereby the seat back is reclined about the reclining hinge shaft in a forward and backward direction thereof.

For reference, a recliner drive unit 320, which provides the seat back frame 300 with reclining force, may be a recliner motor. The recliner drive unit 320 is mounted on the side frames 310 to provide the seat back with rotational driving force. Because the details of the reclining are previously well known in the art, the detailed description thereof is omitted.

The seat cushion frame 200, which is mounted above the base frame 100, is moved upwards or downwards at the rear end portion thereof by actuation of the tiling assembly. The seat cushion frame 200 is rotated forwards and downwards or backwards and upwards, with respect to the base frame 100 by actuation of the slide assembly, whereby the position of the seat cushion frame 200 is changed.

Furthermore, the seat cushion assembly 200 is moved upwards and downwards together with the base frame 100 by actuation of the height assembly.

The seat back frame 300 is folded in a forward and backward direction with respect to the seat cushion frame 200. The seat cushion frame 200 is moved upwards and downwards by the slide assembly and the tilt assembly, and the base frame 100 is moved upwards and downwards together with the seat cushion frame 200 by the height assembly.

Consequently, since not only a dive position, in which the seat back is folded forwards to be positioned horizontally, and a flat bed position, in which the seat back is folded backwards to be parallel to the seat cushion, but also a relaxation position, which is obtained by angular adjustment of the seat back, are realized, the position of the seat may be variously changed, maximizing the availability of space in the passenger compartment.

Figure 3:
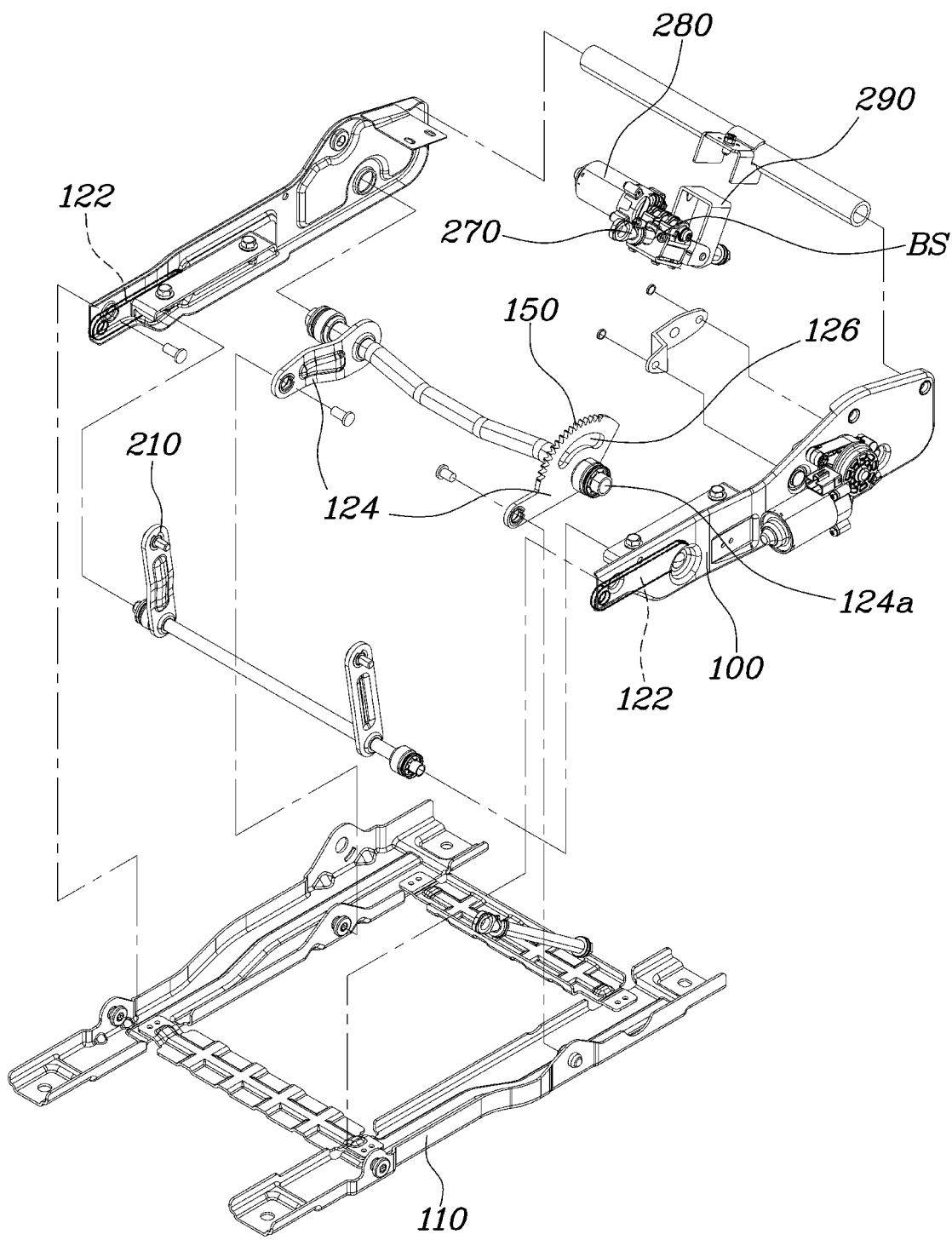
FIG. 3 is an exploded perspective view exemplarily illustrating the constructions of the height assembly and the tilt assembly according to the exemplary embodiment of the present invention.
Figure 4:
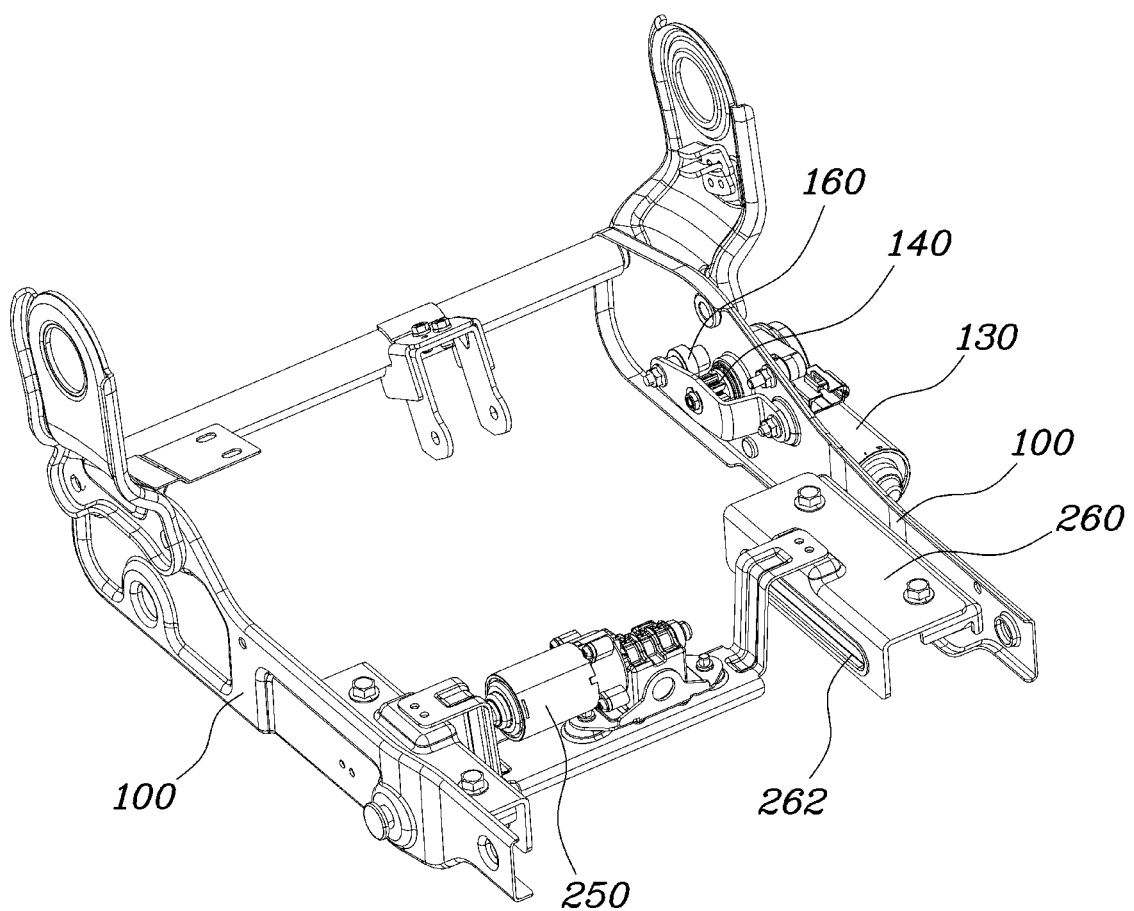
FIG. 4 is a view exemplarily illustrating the construction of the height assembly according to the exemplary embodiment of the present invention.

FIG. 3 is an exploded perspective view exemplarily illustrating the constructions of the height assembly and the tilt assembly according to the exemplary embodiment of the present invention. FIG. 4 is a view exemplarily illustrating the construction of the height assembly according to the exemplary embodiment of the present invention.

The construction of the height assembly will now be described in detail with reference to FIG. 3 and FIG. 4. The height assembly includes a leg frame 110 provided on the bottom surface of the passenger compartment, a height link 120, which is disposed between the leg frame 110 and the base frame 100 and is connected thereto via at least a four-link mechanism, a height drive unit 130 configured to supply driving force, and a gear engagement structure configured to transmit the driving force supplied by the height drive unit 130 to thus rotate the height link 120.

For example, the leg frame 110 may be coupled to a seat rail or the bottom surface of the passenger compartment, and each of two lateral sides of the upper surface of the leg frame 110 may be provided with the base frame 100.

The front end portion of the leg frame 110 and the front end portion of the base frame 100 are hingedly coupled to the two end portions of a front link 122, and the rear end portion of the leg frame 110 and the rear end portion of the base frame 100 are hingedly coupled to the two end portions of a rear link 124, realizing a four-link mechanism.

Here, the height drive unit 130 may be a motor. The rotational driving force supplied by the height drive unit 130 is transmitted to the height link 120 via the gear engagement structure.

The output shaft of the height drive unit 130 is provided with a drive gear 140, and a driven gear 150 is provided at a predetermined distance from the hinge shaft 124a of the height link 120 such that the drive gear 140 is engaged with the driven gear 150.

The drive gear 140 is provided at the base frame 100, and the driven gear 150 is formed about the hinge shaft of the height link 120 coupled to the base frame 100.

For example, the height drive unit 130 is coupled to the base frame 100, and the output shaft of the height drive unit 130 extends through the base frame 100 such that the drive gear 140 is provided in the base frame 100.

The driven gear 150 is formed at a rear link 124 coupled to the base frame 100.

Here, the drive gear 140 may be a pinion gear, and the driven gear 150 may be a sector gear, which has an arched shape at a predetermined radial position from the hinge shaft 124a of the rear link 124. Accordingly, when the drive gear 140 rotates, the driven gear 150, which is engaged with the drive gear 140, is also rotated, rotating the height link 120.

In other words, when the height drive unit 130 is actuated in the state in which the base frame 100 is positioned at a low level, the drive gear 140 is rotated, and the driven gear 150, which is engaged with the drive gear 140, is also rotated, whereby the other end portion of the height link 120 is rotated about the hinge shaft at one end portion of the height link 120.

Here, because the base frame 100 is connected to the four-link mechanism, when the front link 122 and the rear link 124 are rotated about 90 degrees by action of the four-link mechanism, the base frame 100 is rotated upwards, moving the seat cushion frame 200 upwards.

According to the exemplary embodiment of the present invention, a stopping hole 126, which has the form of a sector in which the hinge shaft 124a is configured as the center of the sector, is formed between the hinge shaft 124a of the height link 120 and the driven gear 150. Accordingly, it is possible to limit the rotational angle of the height link 120 by inserting the stopper 160 into the stopping hole 126.

For example, the stopping hole 126 is formed between the driven gear 150 and the hinge shaft 124a of the rear link 124 to have the form of a sector, and the stopper 160 is fixed to the internal side of the base frame 100 to be disposed in the stopping hole 126.

Because the stopper 160 is positioned at one end portion of the internal surface of the stopping hole 126 when the base frame 100 is positioned at a lower level and is positioned at the other end portion of the internal surface of the stopping hole 126 when the base frame 100 is rotated upwards by the action of the four-link mechanism, it is possible to prevent the base frame 100 from being rotated beyond a predetermined rotational angle (for example, 90 degrees).

Figure 5:
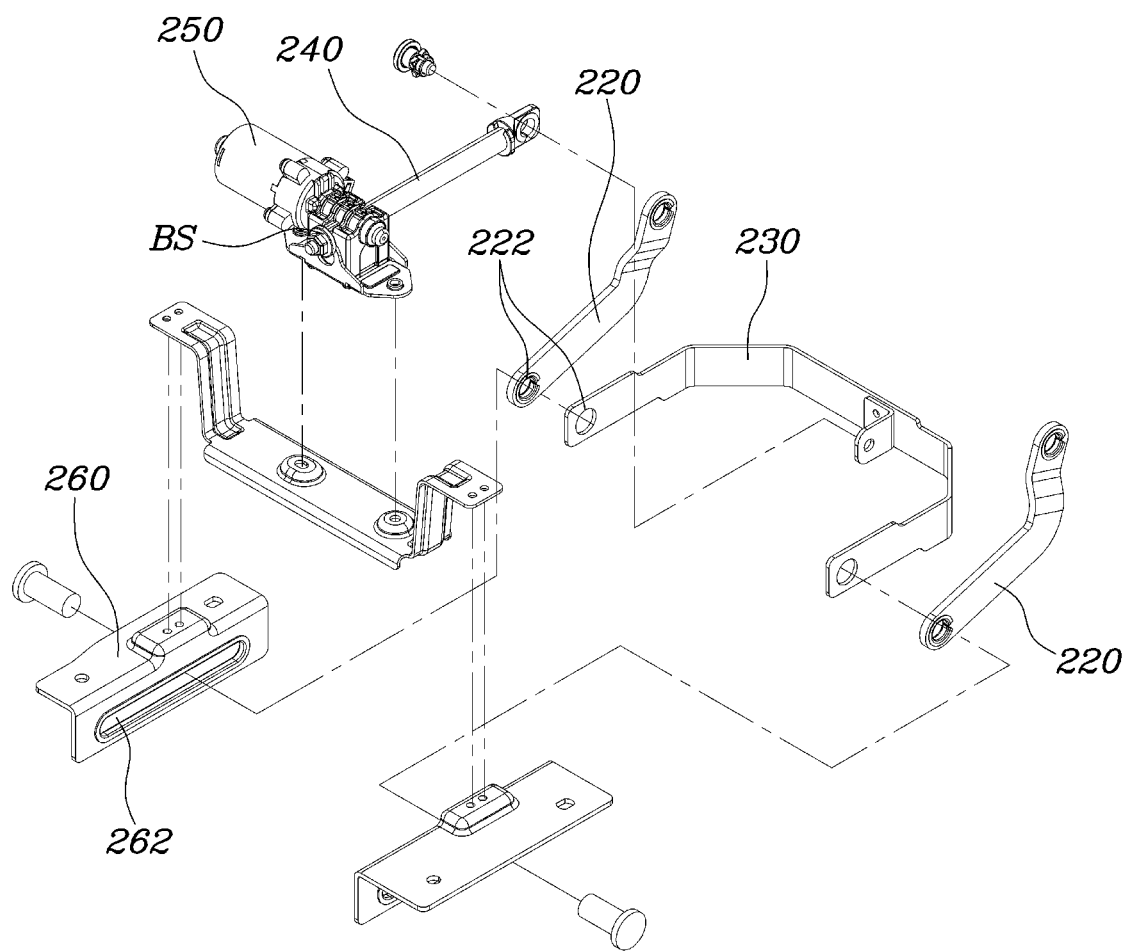
FIG. 5 is an exploded perspective view exemplarily illustrating the construction of the slide assembly according to the exemplary embodiment of the present invention.

FIG. 5 is an exploded perspective view exemplarily illustrating the construction of the slide assembly according to the exemplary embodiment of the present invention.

The construction of the slide assembly will now be described with reference to FIGS. 2 and 5. The slide assembly includes a slide drive unit 250 configured to supply driving force, a dive link 210, which is disposed between the seat cushion frame 200 and the front end portion of the base frame 100 and is connected at respective end portions thereto, and s slide link unit, which is connected at the front end portion thereof to the slide drive unit 250 and is rotatably connected at the rear end portion thereof to the rear end portion of the seat cushion frame 200 to slide together with the seat cushion frame 200 in a forward and backward direction thereof.

The slide link unit includes a slide link 220, which is rotatably connected at the rear end portion thereof to the seat cushion frame 200, a slide bracket 230, which is rotatably connected at the front end portion thereof to the front end portion of the slide link 220, and a slide actuation bar 240, which is connected at the front end portion thereof to the slide drive unit 250 to provide a driving force and is connected at the rear end portion thereof to the rear end portion of the slide bracket 230.

Because the slide drive unit 250 and the slide actuation bar 240 are connected to each other via a ball screw structure Bs, the rotational driving force of the slide drive unit 250 is converted into the linear movement of the slide actuation bar 240.

For example, the upper end portion of the dive link 210 is hingedly coupled to the front end portion of the seat cushion frame 200, and the lower end portion of the dive link 210 is hingedly coupled to the front end portion of the base frame 100.

The slide bracket 230 has a "U" shape. Each of the two end portions of the slide bracket 230 is hingedly coupled to the front end portion of the slide link 220, and the rear end portion of the slide link 220 is hingedly coupled to the rear end portion of the seat cushion frame 200.

The slide actuation bar 240 is coupled at the rear end portion thereof to the center of the slide bracket 230, and is connected at the front end portion thereof to the slide drive unit 250 via the ball screw structure Bs.

To realize the ball screw structure Bs, the slide drive unit 250 may be a motor. Here, a ball nut is rotatably coupled to the output shaft of the slide drive unit 250, and a screw is formed on the external circumferential surface of the slide actuation bar 240 such that the screw is inserted into and engaged with the ball nut.

In other words, when rotational driving force is supplied from the slide drive unit 250 in the state in which the seat cushion frame 200 is positioned at the rear side, the ball nut is rotated, and the rotation of the ball nut is converted into linear movement via the ball screw structure BS, moving the slide actuation bar 240 forwards.

Subsequently, the slide bracket 230 is moved forwards together with the slide actuation bar 240, and the slide link 220 is also moved forwards.

Consequently, the upper end portion of the dive link 210 is rotated forwards about the hinge shaft at the lower end portion of the dive link 210, and the rear end portion of the slide link 220 is rotated downwards about the hinge shaft at the front end portion of the slide link 220, rotating and moving the seat cushion frame 200 forwards and downwards.

The multi-position seat according to the exemplary embodiment of the present invention may further include a slide guide 260, which is coupled to the base frame 100 and has formed therein a guide hole 262, which extends in the sliding direction of the slide link unit.

A guide hinge portion 222, to which the front end portion of the slide link 220 and the front end portion of the slide bracket 230 are connected, is disposed in the guide hole 262 to be movable in a forward and backward direction thereof.

For example, the "L"-shaped slide guide 260 is coupled to the upper surface of the base frame 100, the guide hole 262 is longitudinally formed along the lateral side surface of the slide guide 260, and the guide hinge portion 222 is disposed in the guide hole 262.

Accordingly, when the slide actuation bar 240 is moved forwards, the guide hinge portion 222 is moved along the guide hole 262, stably guiding the sliding movement of the slide link unit including the slide link 220 and the slide bracket 230.

The tilt assembly will now be described with reference to FIG. 2 and FIG. 3. The tilt assembly includes a tilt drive unit 280 configured to supply driving force, and a tilt actuation bar 270, which is connected to the rear end portion of the seat cushion frame 200 and to the tilt drive unit 280 and which is linearly moved in a forward and backward direction using the driving force of the tilt drive unit 280 to move the rear end portion of the seat cushion frame 200 upwards or downwards.

The tilt drive unit 280 and the tilt actuation bar 270 are connected to each other via a ball screw structure Bs such that the rotational driving force supplied from the tilt drive unit 280 is converted into the linear movement of the tilt actuation bar 270.

For example, a tilt bracket 290 is fixed to the center portion of the rear end portion of the base frame 100, and the tilt drive unit 280 is coupled to the tilt bracket 290.

The front end portion of the tilt actuation bar 270 is hingedly coupled to the rear end portion of the seat cushion frame 200, and the rear end portion of the tilt actuation bar 270 is connected to the tilt drive unit 280 via the ball screw structure Bs.

To realize the ball screw structure Bs, the tilt drive unit 280 may be a motor. Here, a ball nut is rotatably coupled to the output shaft of the tilt drive unit 280 and a screw is formed on the external circumferential surface of the tilt actuation bar 270 such that the screw is inserted into the ball nut and is engaged therewith.

In order words, when rotational driving force is supplied from the tilt drive unit 280 in the state in which the rear end portion of the seat cushion frame 200 is lowered, the ball nut is rotated, and the rotation of the ball nut is converted into linear movement via the ball screw structure Bs, moving the tilt actuation bar 270 upwards.

Consequently, the front end portion of the tilt actuation bar 270 pushes the rear end portion of the seat cushion frame 200 upwards.

Furthermore, the rear end portion of the tilt drive unit 280 is hingedly coupled to the base frame 100 such that the front end portion of the tilt drive unit 280 is rotatable upwards and downwards together with the tilt actuation bar 270 about the rear end portion of the tilt drive unit 280.

Because the tilt drive unit 280 is rotatably coupled to the tilt bracket 290, when the seat cushion frame 200 is moved downwards by actuation of the slide assembly, the front end portion of the tilt actuation bar 270 is rotated downwards together with the tilt drive unit 280, moving the seat cushion frame 200 downwards without interfering with the tilt assembly.

The dive position will now be described with reference to FIG. 6D. When the seat cushion frame 200 is rotated forwards and downwards by actuation of the slide assembly and the seat back frame 300 is completely folded forwards, the rear surface of the seat back is positioned horizontally, realizing the dive position.

In the dive position, because the seat back is completely folded forwards and covers the seat cushion in the state in which the seat cushion is moved downwards, the seat back is folded without interfering with the seat cushion, realizing the flat state of the rear surface of the seat back.

The flat bed position will now be described with reference to FIG. 7D. The base frame 100 is rotated upwards by actuation of the height assembly, the rear end portion of the seat cushion frame 200 is moved upwards by actuation of the tilt assembly, and the seat back frame 300 is folded completely backwards by the reclining action, realizing the flat bed position in which the upper surface of the seat cushion and the front surface of the seat back are flush with each other in the horizontal state.

In the flat bed position, the rear end portion of the seat cushion is moved upwards in the state in which the seat cushion is moved upwards, and the base frame 100, which supports the seat cushion, is moved upwards. Subsequently, the seat back is folded completely backwards, whereby the seat cushion and the seat back are arranged in a forward and backward direction and are positioned horizontally in the flat state.

The relaxation position of the seat will now be described with reference to FIG. 8C. The rear end portion of the seat cushion frame 200 is moved downwards by actuation of the tilt assembly, and the seat back frame 300 is folded backwards within a predetermined angular range by reclining action, realizing the relaxation position of the multi-position seat.

In the relaxation position, the rear end portion of the seat cushion is moved downwards, and the seat back is reclined backwards to a predetermined angle from the angle of the seat back in the normal seating state.

Figure 10:
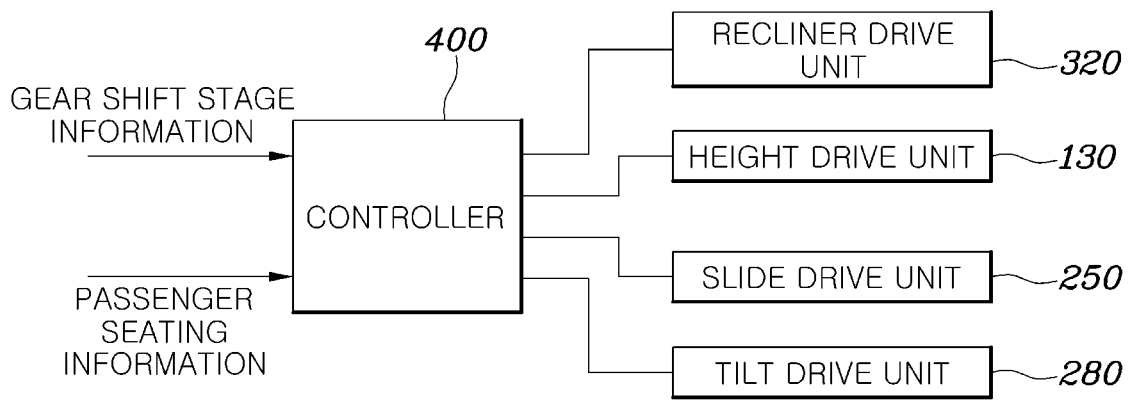
FIG. 10 is a view exemplarily illustrating operation of a controller according to the exemplary embodiment of the present invention.

FIG. 10 is a view exemplarily illustrating the operation of a controller 400 according to the exemplary embodiment of the present invention. The multi-position seat according to the exemplary embodiment of the present invention may further include the controller 400 configured to determine whether or not conversion of the multi-position seat from or into the flat bed position is allowed depending on a current gear shifting state and the posture of a passenger sitting on the multi-position seat.

In other words, the controller 400 performs control to prevent the multi-position seat from being converted into the flat bed position from another position or being converted into another position from the flat bed position to improve stability during traveling of a vehicle.

The controller 400 may perform control to allow a position of the multi-position seat to be converted into the flat bed position only in the "P" gear shifting stage.

The controller 40 may perform control to allow a driver to select a "D" gear shifting stage of a vehicle when a position of the multi-position seat is converted into the normal seating position from the flat bed position.

For example, information related to the gear shifting stage of a vehicle may be directly input to the controller 400 as a gear shifting stage signal, or may be received from a transmission control unit (TCU).

Whether or not a passenger is in the normal seating position may be determined through a seat belt reminder system, a buckle sensor or the like.

In other words, the controller may perform control to allow conversion into the flat bed position only when the gear shifting stage is in the "P" gear shifting stage, and may perform control to allow the gear shifting stage to be converted to the "D" gear shifting stage only when the passenger is sitting on the seat in the normal seating posture in the state in which the position of the seat is converted into the flat bed position.

The controller 400 according to various exemplary embodiments of the present invention may be embodied by nonvolatile memory configured to store an algorithm configured to control the operation of various components of a vehicle or data relating to software instructions for executing the algorithm and a processor configured to perform operations, which will be described below, using the data stored in the memory. Here, the memory and the processor may be embodied as separate chips. Alternatively, the memory and the processor may be embodied as a single chip in which the memory and the processor are integrated. The processor may be embodied as one or more processors.

Figure 9:
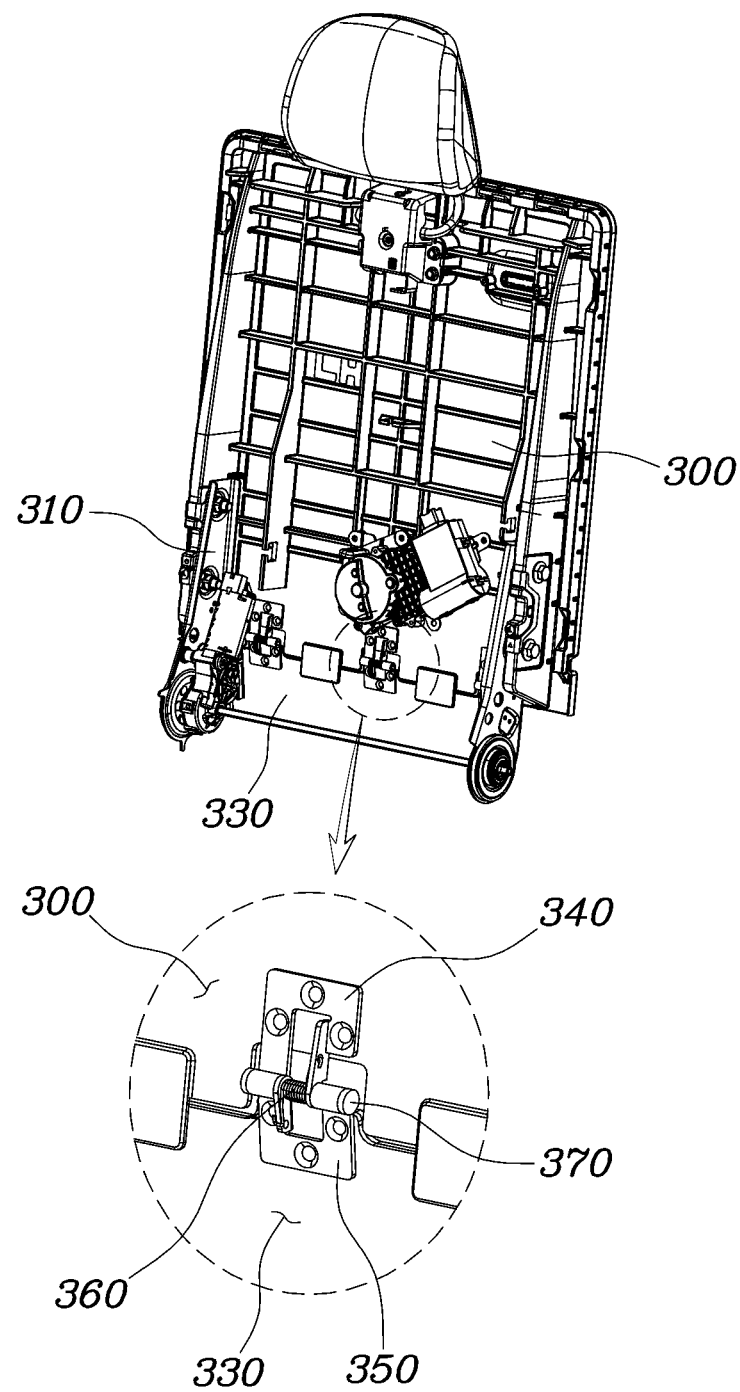
FIG. 9 is a view exemplarily illustrating a structure in which a skirt frame is coupled to the seat back frame according to the exemplary embodiment of the present invention.

FIG. 9 is a view exemplarily illustrating a structure in which a skirt frame 330 is coupled to the seat back frame 300 according to the exemplary embodiment of the present invention.

Referring to the drawing, the multi-position seat according to the exemplary embodiment of the present invention includes the skirt frame 330 rotatably coupled to the lower end portion of the seat back frame 300 via a hinge shaft 370, a side frame 310, which is formed on the front surface of the seat back frame 300 and the lower end portion of which extends to the front surface of the skirt frame 330 to restrict rotation of the skirt frame 330 in the state in which the seat back frame 300 is folded forwards, and an elastic member configured to provide elasticity to thus rotate the end portion of the skirt frame 330 toward the side frame 310.

Here, the elastic member may be a spring 360, the two end portions of which are respectively supported by the seat back frame 300 and the skirt frame 330. The spring 360 may be embodied as a torsion spring configured for being fitted over the skirt hinge shaft 370.

The skirt frame 330 may be made of a material which is tougher than a fabric material.

For example, the lower end portion of the side frame 310 is provided with a recliner hinge shaft 322, and the skirt hinge shaft 370 is provided above the recliner hinge shaft 322.

An upper bracket 340 is fixed to the seat back frame 300 above the skirt hinge shaft 370, and a lower bracket 350 is fixed to the skirt frame 330 under the skirt hinge shaft 370. The two end portions of the spring 360 are respectively supported by the upper bracket 340 and the lower bracket 350 to provide an elastic force to thus always rotate the skirt frame 330 downwards.

Because a conventional seat back pad is provided at the lower portion of the rear surface thereof with a skirt made of a fabric material, there is a problem in that it is difficult to convey a sense of unity between the skirt and a luggage tray when a seat is folded.

Furthermore, the conventional seat exhibits a problem in which the space between the skirt and the luggage tray is externally exposed due to wrinkles generated in the skirt when the number of folding actions of the seat exceeds a predetermined number, and also exhibits another problem in which a hand of passenger may become jammed in the space between the skirt and the luggage tray, thus injuring the passenger.

Figure 6A:
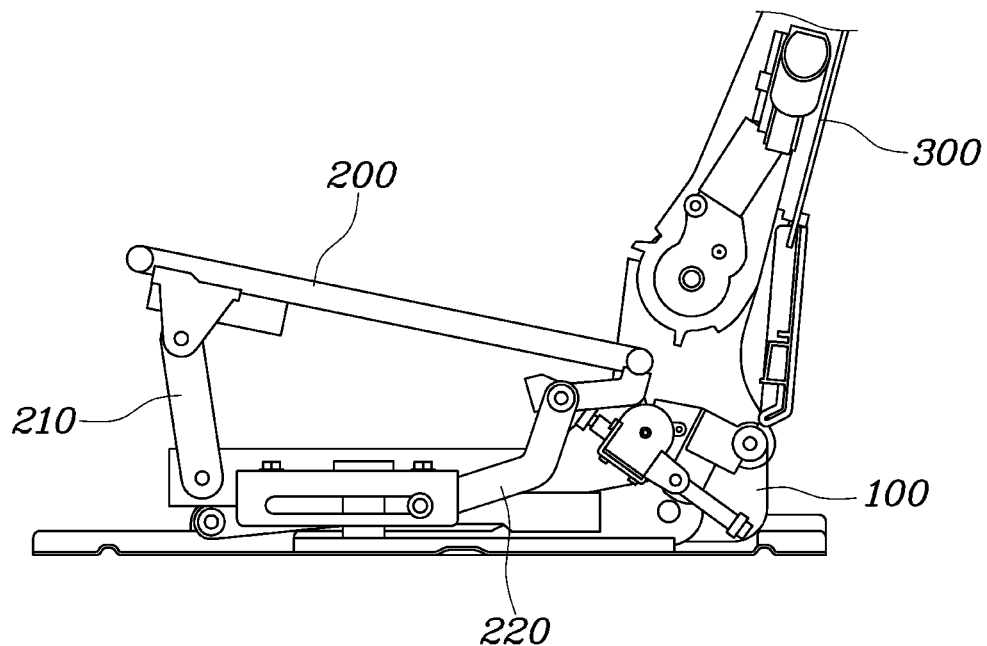
FIG. 6A, FIG. 6B, FIG. 6C, and FIG. 6D are views exemplarily illustrating an operation of the multi-position seat according to the exemplary embodiment of the present invention in which the position of the seat is converted into the normal seating position from the dive position.
Figure 6B:
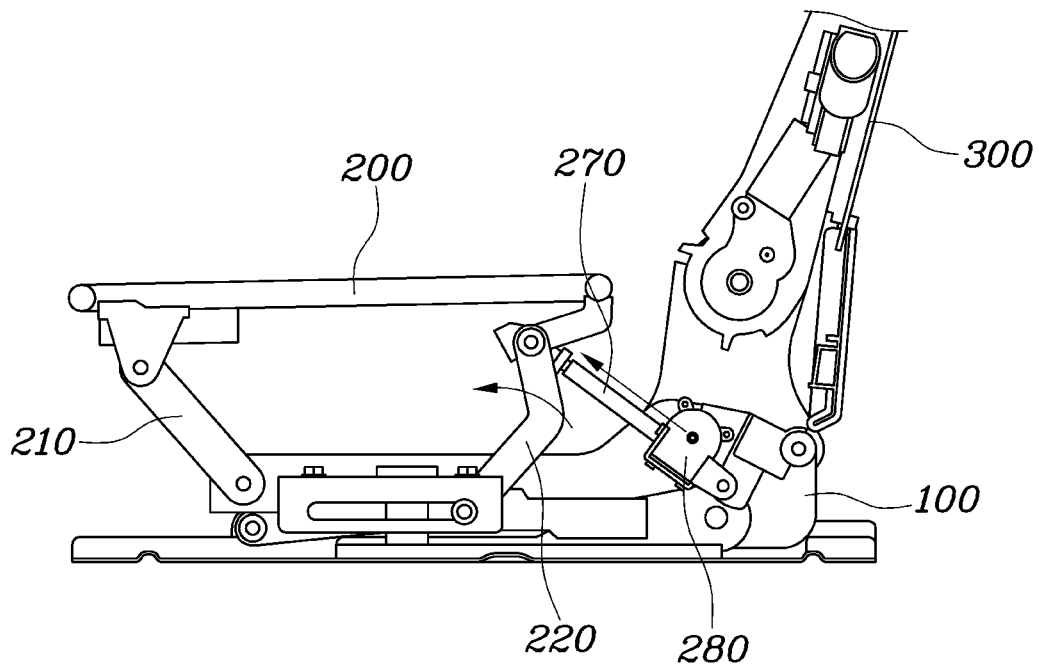
Figure 6C:
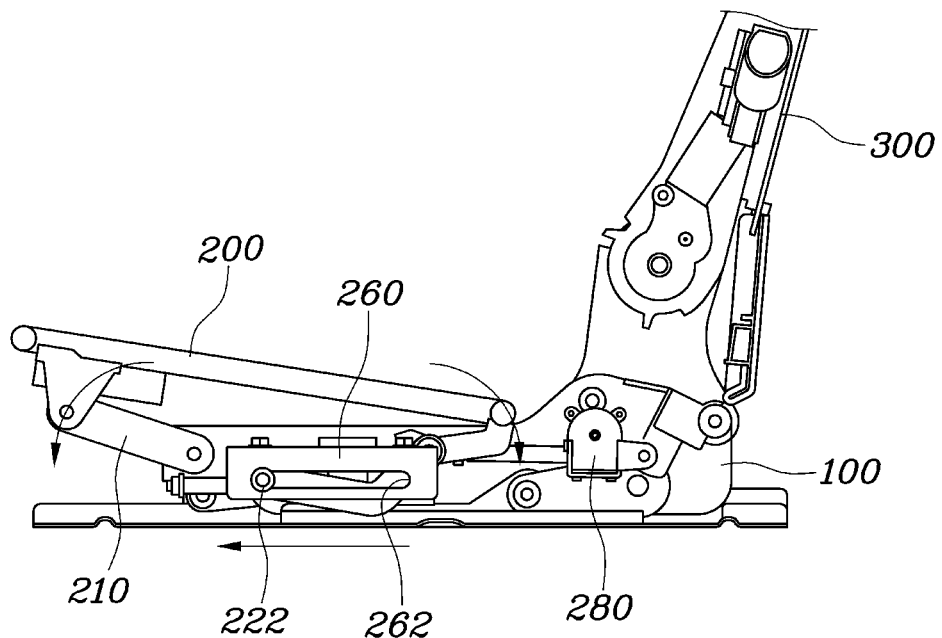
Figure 6D:
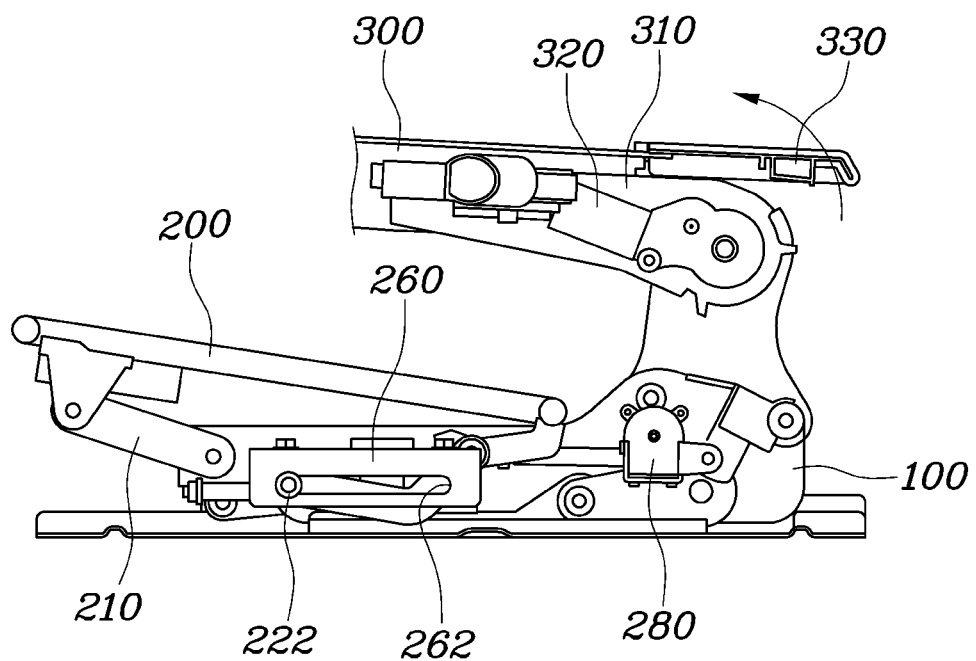

In the case of the exemplary embodiment of the present invention, when the position of the seat is converted into the dive position, as illustrated in FIG. 6D, because the skirt frame 330 catches on the two lateral side frames 310 and is not rotated downwards, the skirt frame 330 covers the space between the seat back and the luggage tray, assuring a sense of unity between the seat back and the luggage tray and preventing the risk of injury caused by a portion of a body of a passenger being jammed in the space inside the skirt frame 330.

Figure 7A:
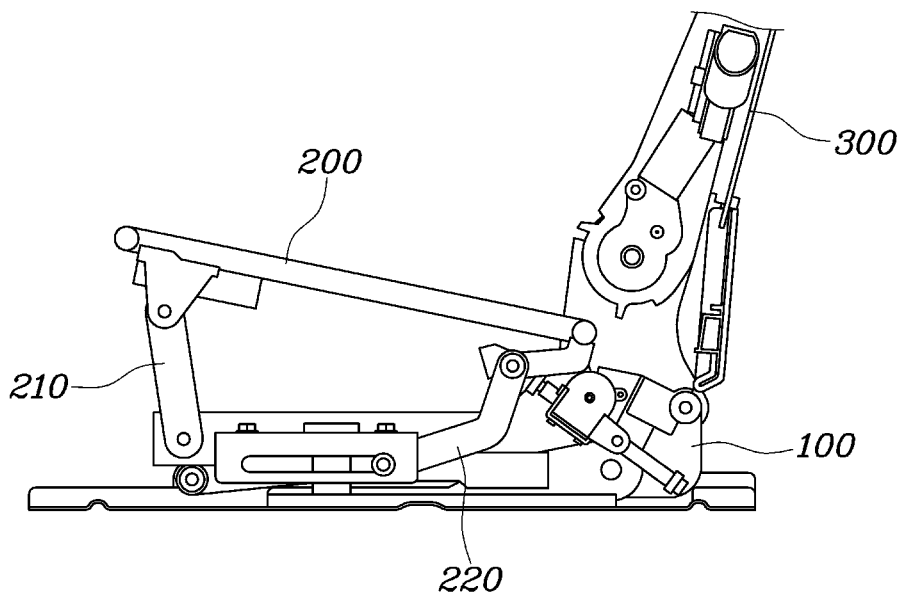
FIG. 7A, FIG. 7B, FIG. 7C, and FIG. 7D are views exemplarily illustrating an operation of the multi-position seat according to the exemplary embodiment of the present invention in which the position of the seat is converted into the flat bed position from the normal seating position.
Figure 7B:
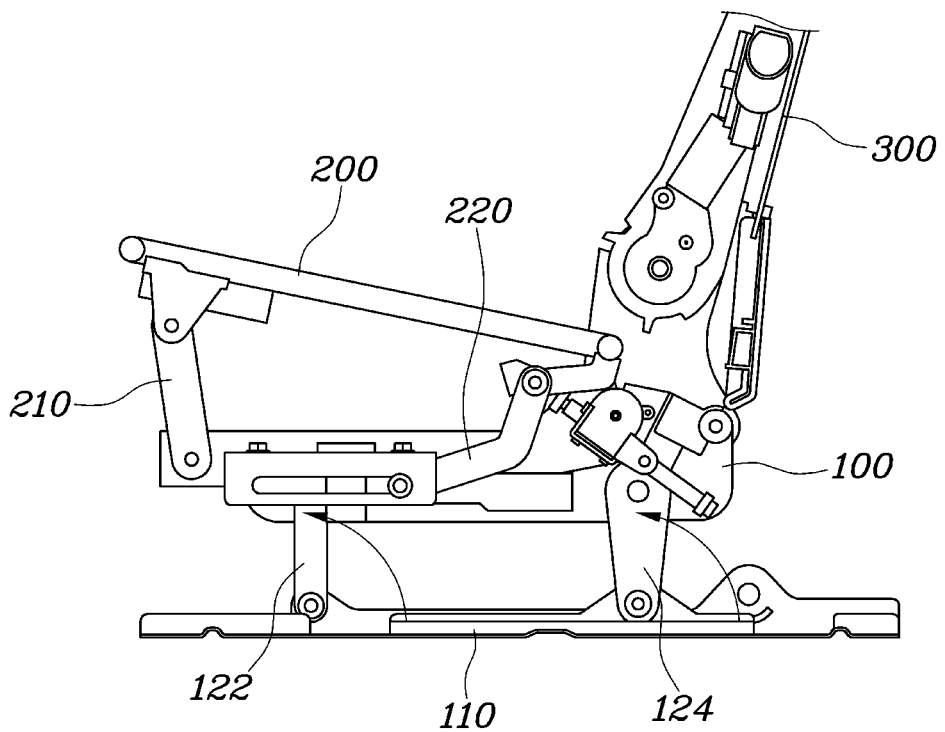
Figure 7C:
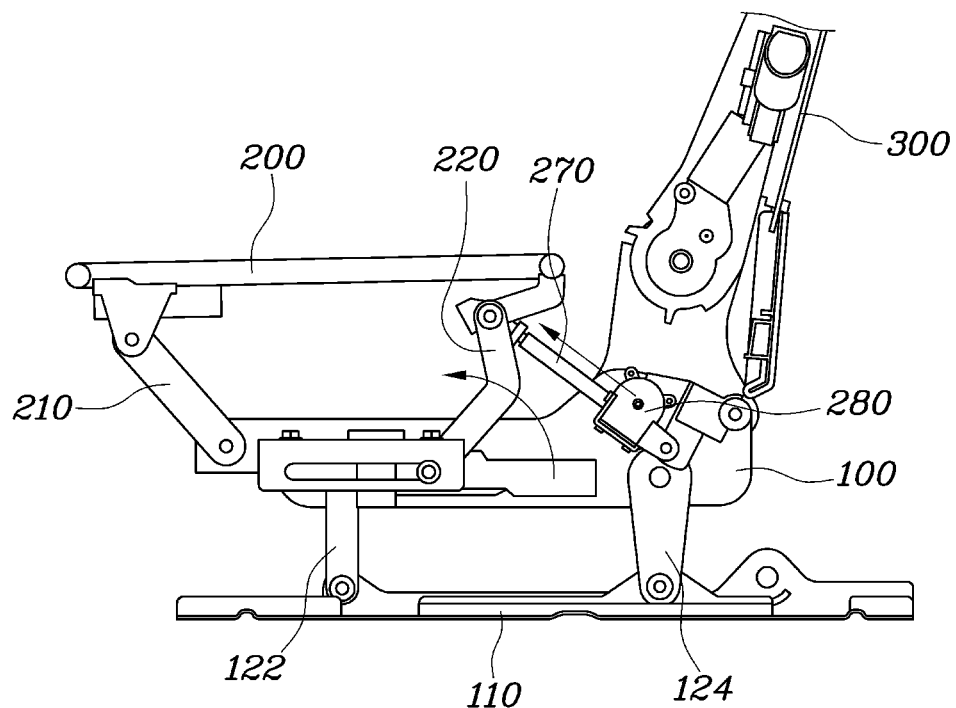
Figure 7D:
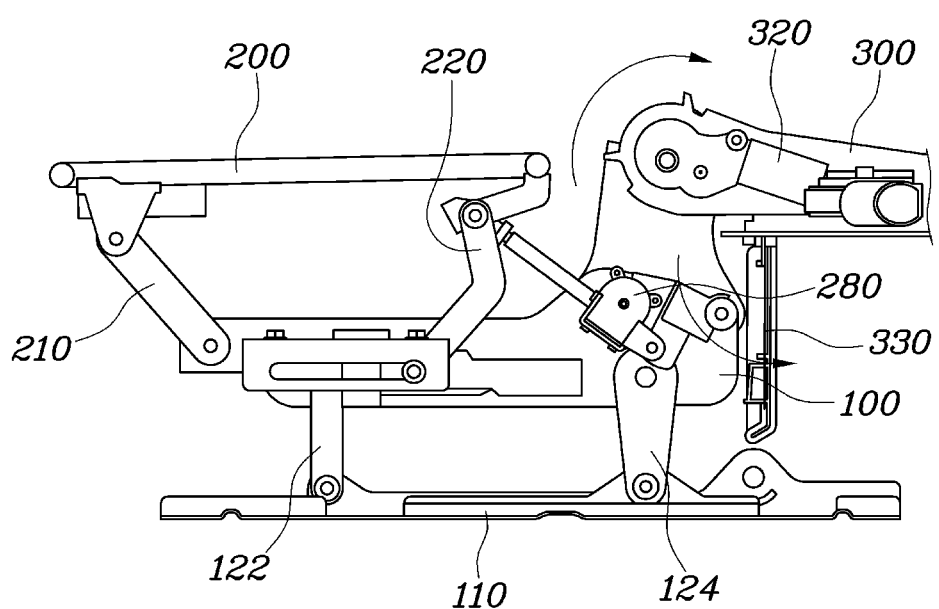
Figure 8A:
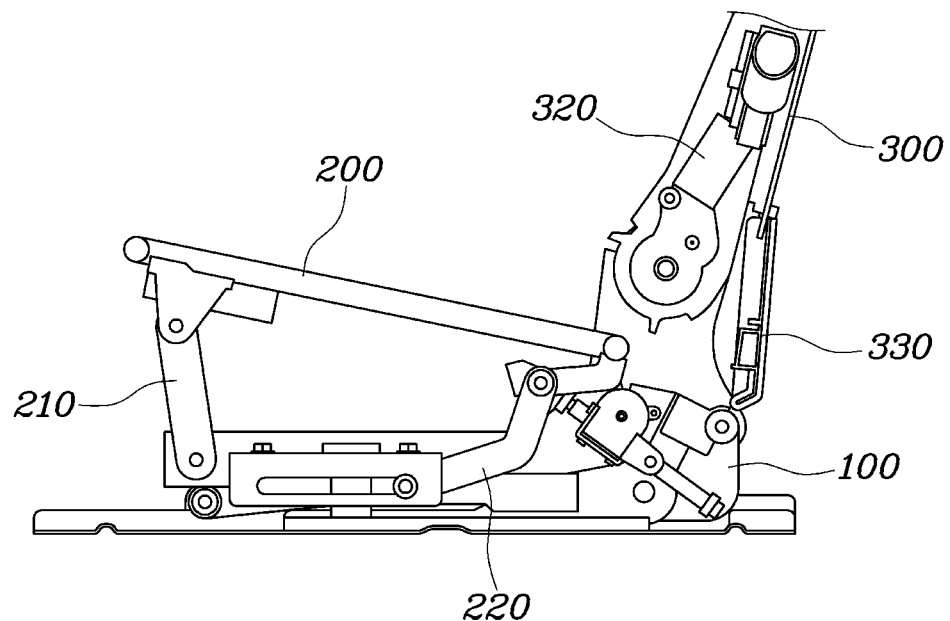
FIG. 8A, FIG. 8B and FIG. 8C are views exemplarily illustrating an operation of the multi-position seat according to the exemplary embodiment of the present invention in which the position of the seat is converted into the relaxation position from the normal seating position.
Figure 8B:
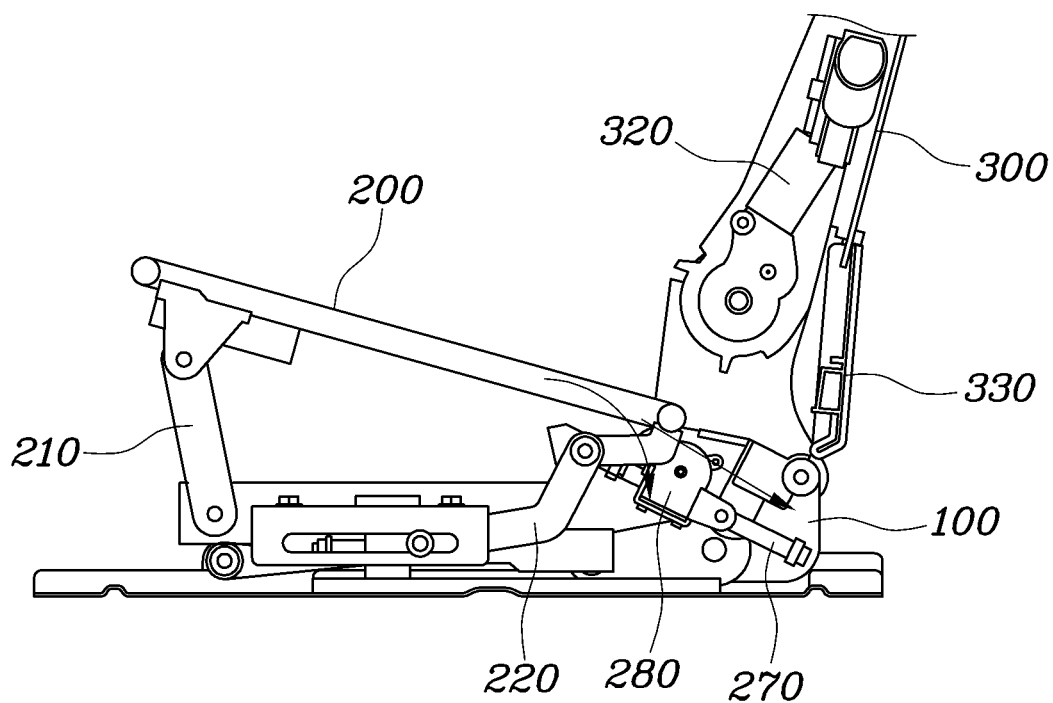
Figure 8C:
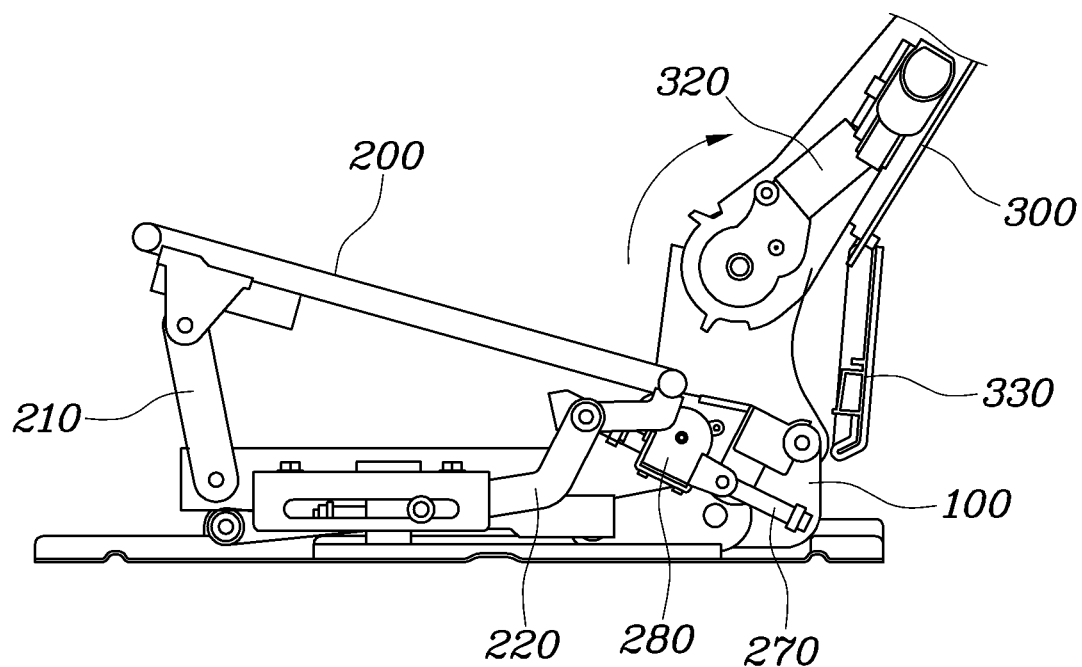

In the cases of the normal seating position shown in FIG. 8A and the relaxation position shown in FIG. 8C, in the case of the flat bed position shown in FIG. 7D, because the skirt frame 330 is configured to be rotated about the hinge shaft 370 while the end portion of the skirt frame 330 slides along the base frame 100, the skirt frame 330 does not enter the area under the seat cushion, preventing the skirt frame 330 from interfering with components under the seat cushion.

FIG. 6A, FIG. 6B, FIG. 6C, and FIG. 6D are views exemplarily illustrating the operation of the multi-position seat according to the exemplary embodiment of the present invention in which the position of the seat is converted into the normal seating position from the dive position.

When the tilt actuation bar 270 is moved forwards and upwards by activating the tilt drive unit 280 in the normal seating position shown in FIG. 6A, the rear end portion of the seat cushion frame 200 is moved upwards while the slide link 220 is rotated counterclockwise, as illustrated in FIG. 6B.

Subsequently, when the slide actuation bar 240 is moved forwards by activating the slide drive unit 250, the slide bracket 230 coupled to the slide actuation bar 240 and the slide link 220 are moved forwards.

At the present time, the guide hinge portion 222 at the front end portion of the slide link 220 is moved forwards along the guide hole 262, and the rear end portion of the slide link 220 is rotated in a clockwise direction thereof. Furthermore, the dive link 210 is rotated in a counterclockwise direction, and the seat cushion frame 200 is thus moved downwards.

Subsequently, the seat back frame 300 is reclined forwards by actuation of the recliner actuation unit 320, and the seat back is thus completely folded on the seat cushion, converting the position of the seat into the dive position.

FIG. 7A, FIG. 7B, FIG. 7C, and FIG. 7D are views exemplarily illustrating an operation of the multi-position seat according to the exemplary embodiment of the present invention in which the position of the seat is converted into the flat bed position from the normal seating position.

When the rear link 124 is rotated in a counterclockwise direction by activating the height drive unit 130 in the normal seating position shown in FIG. 7A, the rear link 124 and the front link 122 are rotated in a counterclockwise direction by the four-link mechanism, and the base frame 100 is also rotated in a counterclockwise direction and is moved upwards, as illustrated in FIG. 7B.

Subsequently, when the tilt actuation bar 270 is moved forwards and upwards by activating the tilt actuation unit 280, the slide link 220 is rotated in a counterclockwise direction, and the rear end portion of the seat cushion frame 200 is moved upwards, as illustrated in FIG. 7C.

Subsequently, the seat back frame 300 is reclined backwards by actuation of the recliner drive unit 320 to completely fold the seat back in the backward direction of the seat cushion, whereby the position of the seat is converted into the flat bed position.

FIG. 8A, FIG. 8B and FIG. 8C are views exemplarily illustrating the operation of the multi-position seat according to the exemplary embodiment of the present invention in which the position of the seat is converted into the relaxation position from the normal seating position.

When the tilt actuation bar 270 is moved backwards and downwards by activating the tilt drive unit 280 in the normal seating position shown in FIG. 8A, the slide link 220 is rotated in a clockwise direction, and the rear end portion of the seat cushion frame 200 is moved downwards, as illustrated in FIG. 8B.

Subsequently, the seat back frame 300 is reclined backwards to a predetermined angle by actuation of the recliner drive unit 320, and the seat back is folded to an angle such that a passenger is configured for leaning on the seat at an incline, converting the position of the seat into the relaxation position.

As is apparent from the above description, various aspects of the present invention are directed to providing a multi-position seat, which is configured for realizing not only a dive position in which a seat back is folded forwards to be positioned horizontally and a flat bed position in which the seat back is folded backwards such that the seat back and a seat cushion are flush with each other in a horizontal state but also a relaxation position obtained by adjustment of an angle of the seat back, making it possible to variably change the position of the seat and to maximize availability of space inside a passenger compartment.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the FIGURES. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A multi-position seat comprising:
   a base frame and a seat cushion frame which is positioned above the base frame and is connected to the base frame via a link mechanism;
   a height assembly configured to move the base frame mounted on a vehicle body;
   a slide assembly configured to move the seat cushion frame, upwards and downwards by sliding action of the link mechanism in a forward and backward direction thereof;
   a tilt assembly configured to move a rear end portion of the seat cushion frame upwards and downwards; and
   a seat back frame hingedly coupled to a rear end portion of the base frame to be reclined.

2. The multi-position seat of claim 1, wherein the height assembly includes:
   a leg frame provided on a bottom surface of a passenger compartment;
   a height link, which is disposed between the leg frame and the base frame and is connected thereto via a four-link mechanism;

a height drive unit configured to supply driving force; and
a gear engagement structure configured to transmit the driving force supplied by the height drive unit to the height link to rotate the height link.

3. The multi-position seat of claim 2, further including:
a drive gear provided at an output shaft of the height drive unit; and
a driven gear provided at a predetermined radial distance from a hinge shaft of the height link to be gear-engaged with the drive gear.

4. The multi-position seat of claim 3, wherein the drive gear is provided at the base frame, and the driven gear is formed around the hinge shaft of the height link coupled to the base frame.

5. The multi-position seat of claim 3, further including:
a stopping hole having a sector shape, a center of which is located at the hinge shaft, wherein the stopping hole is formed between the hinge shaft of the height link and the driven gear; and
a stopper disposed in the stopping hole to limit a rotational angle of the height link.

6. The multi-position seat of claim 1, wherein the slide assembly includes:
a slide drive unit configured to supply driving force;
a dive link, first and second end portions of which are connected to the seat cushion frame and to a front end portion of the base frame, respectively; and
a slide link unit, which is connected at a front end portion thereof to the slide drive unit and is rotatably connected at a rear end portion thereof to a rear end portion of the seat cushion frame to slide together with the seat cushion frame by the driving force of the slide drive unit in a forward and backward direction thereof.

7. The multi-position seat of claim 6, wherein the slide link unit includes:
a slide link, which is rotatably connected at a rear end portion thereof to the seat cushion frame;
a slide bracket, which is rotatably connected at a front end portion thereof to a front end portion of the slide link; and
a slide actuation bar, which is connected at a front end portion thereof to the slide drive unit to provide a driving force and is coupled at a rear end portion thereof to a rear end portion of the slide bracket.

8. The multi-position seat of claim 7, wherein the slide drive unit and the slide actuation bar are connected to each other via a ball screw structure so that rotational driving force of the slide drive unit is converted into linear movement of the slide actuation bar.

9. The multi-position seat of claim 7, further including a slide guide, which is coupled to the base frame and has therein a guide hole, which extends in a sliding direction of the slide link unit,
wherein a guide hinge portion, to which a front end portion of the slide link and the front end portion of the slide bracket are connected, is disposed in the guide hole and move in a forward and backward direction therein.

10. The multi-position seat of claim 1, wherein the tilt assembly includes:
a tilt drive unit configured to supply driving force; and
a tilt actuation bar, which is connected to the rear end portion of the seat cushion frame and to the tilt drive unit and which is linearly moved in a forward and backward direction using the driving force of the tilt drive unit to move the rear end portion of the seat cushion frame upwards or downwards.

11. The multi-position seat of claim 10, wherein the tilt drive unit and the tilt actuation bar are connected to each other via a ball screw structure so that rotational driving force supplied from the tilt drive unit is converted into linear movement of the tilt actuation bar.

12. The multi-position seat of claim 10, wherein a rear end portion of the tilt drive unit is hingedly coupled to the base frame so that the tilt actuation bar is rotated upwards and downwards together with a front end portion of the tilt drive unit about the rear end portion of the tilt drive unit.

13. The multi-position seat of claim 1, wherein the seat cushion frame is rotated forwards and downwards by actuation of the slide assembly, and the seat back frame is completely folded forwards by reclining actuation, realizing a dive position in which a rear surface of a seat back is positioned horizontally.

14. The multi-position seat of claim 1, wherein the base frame is rotated and moved upwards by actuation of the height assembly, the rear end portion of the seat cushion frame is moved upwards by actuation of the tilting assembly, and the seat back frame is folded completely backwards by reclining actuation, realizing a flat bed position in which an upper surface of a seat cushion and a front surface of a seat back are flush with each other in a horizontal state.

15. The multi-position seat of claim 1, wherein the rear end portion of the seat cushion frame is moved downwards by actuation of the tilt assembly, and the seat back frame is folded backwards within a predetermined angular range by reclining actuation, realizing a relaxation position of the multi-position seat.

16. The multi-position seat of claim 14, further including a controller configured to perform control to determine whether or not conversion of the multi-position seat from or into the flat bed position is allowed depending on a current gear shifting state and a posture of a passenger sitting on the multi-position seat.

17. The multi-position seat of claim 16, wherein the controller is electrically connected to the height assembly, the slide assembly, and the tilt assembly, and is configured to control at least one of the height assembly, the slide assembly, and the tilt assembly to allow a position of the multi-position seat to be converted into the flat bed position only in a "P" gear shifting stage of a vehicle.

18. The multi-position seat of claim 16, wherein the controller is configured to perform control to allow a driver to select a "D" gear shifting stage of a vehicle when a position of the multi-position seat is converted into a normal seating position from the flat bed position.

19. The multi-position seat of claim 1, further including:
a skirt frame rotatably coupled to a lower end portion of the seat back frame to be rotated about a skirt hinge shaft;
a side frame, which is formed on a front surface of the seat back frame and a lower end portion of which extends toward a front surface of the skirt frame to limit rotation of the skirt frame when the seat back frame is folded forwards; and
an elastic member configured to provide an elastic force to rotate an end portion of the skirt frame toward the side frame.

20. A method of controlling the multi-position seat of claim 1, the method including:
determining, by a controller electrically connected to the height assembly, the slide assembly, and the tilt assembly, whether or not conversion of the multi-position seat from or into a flat bed position is allowed depending on a current gear shifting state and a posture of a passenger sitting on the multi-position seat; and allowing, by the controller, a position of the multi-position seat to be converted into the flat bed position only in a "P" gear shifting stage of the vehicle; and allow, by the controller, a driver to select a "D" gear shifting stage of the vehicle when the position of the multi-position seat is converted into a normal seating position from the flat bed position.

\* \* \* \* \*